United States Patent Office 3,270,020
Patented August 30, 1966

3,270,020
1-CYANOETHYL 9,10 DIHYDRO ERGOCORNINE
Albert Hofmann and Franz Troxler, both of Bottmingen, Basel-Land, Switzerland, assignors, by mesne assignments, to Fidelity Union Trust Company, executive trustee
No Drawing. Original application Nov. 5, 1962, Ser. No. 235,559, now Patent No. 3,190,884, dated June 22, 1965. Divided and this application Nov. 19, 1964, Ser. No. 412,313
2 Claims. (Cl. 260—285.5)

The present invention relates to new ergolene and ergoline derivatives, their acid addition salts, and pharmaceutical compositions containing as an essential active ingredient a said new ergolene or ergoline derivative or a non-toxic pharmaceutically acceptable acid addition salt in an inert carrier or vehicle prepared in unit dosage form. This application is a division of copending application Serial No. 235,559 filed November 5, 1962 now U.S. Patent No. 3,190,884, granted June 22, 1965.

The present invention provides compounds of the formula:

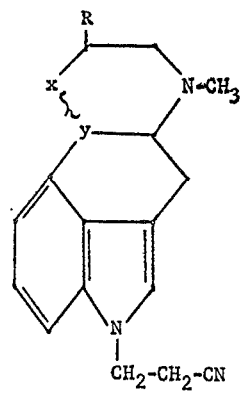

(I)

in which R is an alkoxycarbonyl, dialkylcarbamoyl, hydroxyalkylcarbamoyl, dialkylureido or alkoxycarbonylamino radical, whereof the alkyl portion in each radical contains from one to four carbon atoms inclusive, a hydroxymethyl radical or a carbonyl radical substituted with the tripeptide radical of a natural ergot alkaloid of the peptide type, and $\widetilde{x\ y}$ signifies the radical

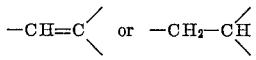

their acid addition salts, and pharmaceutical compositions containing, in addition to an inert carrier or vehicle, a compound I and/or an acid addition salt thereof.

The compounds I and their acid addition salts are produced by reacting a compound of the formula:

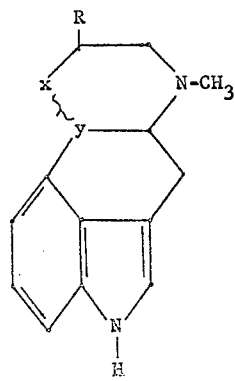

(II)

in which R and $\widetilde{x\ y}$ have the above significance, with acrylonitrile in the presence of a proton acceptor and, when an acid addition salt is required, salt formation is effected with an organic or inorganic acid in a manner per se known.

Suitable acids for salt formation are, for example, hydrochloric, hydrobromic, hydriodic, sulfuric, citric, tartaric, succinic, maleic, malic, acetic, oxalic, benzoic, fumaric, gallic, hexahydrobenzoic, methanesulfonic and phosphoric acids.

The possibilities of obtaining variations of the lysergic acid molecule and its derivatives, the most important of which are the natural ergot alkaloids and their 9,10-dihydro compounds, by chemical substitution, are very limited. Chemical conversions are difficult because of the tendency of the lysergic acid molecule to decompose due to its susceptibility towards acids, bases and oxidation agents and even to the oxygen of the air and light and because of the ease with which isomers are formed. It was thus surprising to find that a cyanoethyl radical could readily be introduced into the 1-position of the lysergic acid molecule.

The production of compounds I may, for example, be effected by dissolving a compound II in a suitable solvent such as dioxane and reacting it with acrylonitrile in the presence of a proton acceptor, e.g., sodium methylate, sodium ethylate or benzyl trimethylammonium hydroxide, at room temperature or higher. Alcohols have been found to be unsuitable as solvents as they themselves react with acrylonitrile to some extent. Acrylonitrile itself may also be used as the solvent and while the starting materials sometimes do not initially readily dissolve therein they generally go into solution satisfactorily during the course of the reaction.

For the purpose of isolation, the reaction mixture is preferably taken up and shaken in a binary solvent mixture, e.g., ether/aqueous tartaric acid. The desired compound I is obtained from the acidic aqueous layer, isolation and purification being effected in accordance with known methods, e.g., by chromatography on aluminum oxide and/or recrystallization.

When acrylonitrile is used as the solvent and a solid alkali metal alcoholate as the proton acceptor, the latter may simply be filtered off, the acrylonitrile evaporated and its polymerization products separated by taking up the residue in chloroform and chromatographing the chloroform solution of the crude product.

The compounds I are solid at room temperature. They give positive Van Urk's and Keller's color reactions in shades which differ from the corresponding reactions of the starting materials.

The compounds I are useful as intermediates in the production of pharmaceuticals or themselves have pharmaceutical properties. The pharmaceutical compounds have a serotonin-inhibiting action so that they may be used in the treatment of psychic and rheumatic illnesses as well as of allergies, inflammations and migraine. 1-cyanoethyl-D-lysergic acid (+)-butanolamide-(2') has been found to have an especially strong serotonin-inhibiting action. An effective amount of a compound I is combined with an inert carrier or vehicle to provide a pharmaceutical composition in unit dosage form.

The term "known" as used herein designates a method described in the literature on the subject or in actual use.

In the following non-limitative example all temperatures are stated in degrees centigrade. The melting points are corrected.

*Example.—1-cyanoethyl-9,10-dihydro-ergocornine*

1.7 g. of 9,10-dihydro-ergocornine are heated to the boil at reflux with 10 cc. of acrylonitrile and 0.2 g. of benzyl-trimethyl-ammonium hydroxide for 2 hours. The mixture is then shaken between a 1% aqueous tartaric acid and ether and the crude bases, which have been isolated in the usual manner, are chromatographed on a column of 55 g. of aluminium oxide. The 1-cyanoethyl-9,10-dihydro-ergocornine is washed into the filtrate with absolute chloroform and crystallizes from ethyl acetate in the shape of leaflets containing ethyl acetate and having a melting point of 177–179°. $[\alpha]_D^{20} = -26°$ (c.=0.5 in pyridine). Keller's color reaction: weak pure blue. Van Urk's color reaction: very weak grey-pink.

What is claimed is:
1. 1-cyanoethyl-9,10-dihydro-ergocornine.
2. A non-toxic pharmaceutically acceptable acid addition salt of 1-cyanoethyl-9,10-dihydro-ergocornine.

No references cited.

HENRY R. JILES, *Acting Primary Examiner.*

DONALD G. DAUS, *Assistant Examiner.*